United States Patent
Huang (10) Patent No.: US 12,279,327 B2
(45) Date of Patent: Apr. 15, 2025

(54) COMMUNICATION CONFIGURATION METHOD AND APPARATUS

(71) Applicant: VIVO MOBILE COMMUNICATION CO., LTD., Dongguan (CN)

(72) Inventor: Li Huang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 18/195,894

(22) Filed: May 10, 2023

(65) Prior Publication Data

US 2023/0284324 A1   Sep. 7, 2023

Related U.S. Application Data

(63) Continuation of application No. PCT/CN2021/129002, filed on Nov. 5, 2021.

(30) Foreign Application Priority Data

Nov. 10, 2020   (CN) .......................... 202011247190.9

(51) Int. Cl.
*H04L 65/1016* (2022.01)
*H04L 65/1073* (2022.01)
(Continued)

(52) U.S. Cl.
CPC ......... *H04W 76/20* (2018.02); *H04L 65/1016* (2013.01); *H04L 65/1073* (2013.01); *H04L 65/1104* (2022.05); *H04W 88/06* (2013.01)

(58) Field of Classification Search
CPC ..... H04W 76/16; H04W 88/06; H04W 76/28; H04L 65/1016
See application file for complete search history.

(56) References Cited

U.S. PATENT DOCUMENTS

| 9,826,570 B1 | 11/2017 | Gupta et al. |
| 2020/0068382 A1* | 2/2020 | Kumar ................. H04W 88/06 |

FOREIGN PATENT DOCUMENTS

| CN | 104113937 A | 10/2014 |
| CN | 111093289 A * | 5/2020 |

(Continued)

OTHER PUBLICATIONS

G. Akman, V. Niemi and P. Ginzboorg, "AKMA Support in Multi SIM User Equipment," 2019 25th Conference of Open Innovations Association (FRUCT), Helsinki, Finland, 2019, pp. 15-24. (Year: 2019).*

(Continued)

*Primary Examiner* — Messeret F Gebre
(74) *Attorney, Agent, or Firm* — IPX PLLC (57) ABSTRACT

A communication configuration method and apparatus are provided. The method is applied to an electronic device, the electronic device includes at least two Subscriber Identity Module (SIM) cards, where the first SIM card of the electronic device is used to provide mobile data service communication, and the second SIM card is registered with an IP Multimedia Subsystem (IMS) service. The method includes: in a case that the electronic device is used as a Session Initiation Protocol (SIP) client, configuring that the second SIM card communicates with a SIP server by using a User Datagram Protocol (UDP) transmission mode, or configuring that the second SIM card communicates with the SIP server by using a Transmission Control Protocol (TCP) transmission mode, and after determining that the second SIM card has completed sending of a SIP request and receiving of a SIP response, interrupting an established TCP socket.

17 Claims, 3 Drawing Sheets

(51) Int. Cl.
  *H04L 65/1104* (2022.01)
  *H04W 76/20* (2018.01)
  *H04W 88/06* (2009.01)

(56) References Cited

FOREIGN PATENT DOCUMENTS

| | | | |
|---|---|---|---|
| CN | 111246449 | A | 6/2020 |
| CN | 111954203 | A | 11/2020 |
| CN | 112333803 | A | 2/2021 |
| JP | 2016157994 | A * | 9/2016 |
| WO | 2017136959 | A1 | 8/2017 |
| WO | 2020128258 | A1 | 6/2020 |

OTHER PUBLICATIONS

Tripathi, R., & Barua, G. (2014). Dynamic internet pricing and bandwidth guarantees with nash equilibrium. (Year: 2014).*

J. L. Buthler and T. Sorensen, "Dynamic Multi-SIM Gap Creating Procedure," 2016 IEEE 84th Vehicular Technology Conference (VTC-Fall), Montreal, QC, Canada, 2016, pp. 1-5. (Year: 2016).*
International Search Report issued in corresponding International Application No. PCT/CN2021/129002, mailed Dec. 23, 2021, 4 pages.
First Office Action issued in related Chinese Application No. 202011247190.9, mailed Jan. 4, 2022, 6 pages.
Second Office Action issued in related Chinese Application No. 202011247190.9, mailed Sep. 5, 2022, 3 pages.
Extended European Search Report issued in related European Application No. 21891049.5, mailed Apr. 2, 2024, 10 pages.
Office Action issued in related European Application No. 21891049.5, mailed Feb. 14, 2025, 6 pages.
Alan B Johnson Ed -Alan B Johnston: "SIP: Understanding the Session Initiation Protocol, Passage", Jan. 1, 2001, SIP: Understanding the Session Initiation Protocol, Artech House, Inc, pp. 23-44, XP002538549, 22 pages.

* cited by examiner

COMMUNICATION CONFIGURATION METHOD AND APPARATUS

CROSS-REFERENCE TO RELATED APPLICATIONS

This application is a continuation of International Application No. PCT/CN2021/129002, filed on Nov. 5, 2021, which claims priority to Chinese Patent Application No. 202011247190.9, filed on Nov. 10, 2020. The entire contents of each of the above-identified applications are expressly incorporated herein by reference.

TECHNICAL FIELD

The present application belongs to the technical field of communication, and specifically, relates to a communication configuration method and apparatus.

BACKGROUND

At present, dual-card single-pass is the mainstream mode of smartphones, and in some areas, there are three-card single-pass or even more-card single-pass solutions. Their common feature is that these Subscriber Identity Module (SIM) cards (or eSIM) inserted into a mobile phone at the same time can maintain a registration status at the same time, but a number of antennas of the terminal cannot meet the needs of all SIM cards to transmit data at the same time and usually there is one antenna, which is the so-called single-pass. Usually, the terminal needs to set a card to provide data services (such as Internet access) by default, the card is called the main card, and the other cards are secondary cards.

When one of the cards needs to send and receive data, it needs to occupy antenna resources, so that other cards cannot send and receive data. Functions of smartphone terminals are getting stronger and stronger, and online games, online videos, video chats, etc. can greatly improve user experience. However, these applications have high requirements for real-time data. When the main card is performing a service with a high low-delay requirement, such as online game, it is affected by the secondary card's preemption of antenna resources, resulting in freezes and affecting user experience.

SUMMARY

The embodiments of the present application provide a communication configuration method and apparatus.

According to a first aspect, an embodiment of the present application provides a communication configuration method, which is applied to an electronic device, where the electronic device includes at least two subscriber identity module SIM cards, a first SIM card is used to provide mobile data service communication, a second SIM card is registered with an IP Multimedia Subsystem (IMS) service, and the method includes:

in a case that the electronic device is used as a Session Initiation Protocol (SIP) client, configuring that the second SIM card communicates with a SIP server by using a User Datagram Protocol (UDP) transmission mode, or configuring that the second SIM card communicates with the SIP server by using a Transmission Control Protocol (TCP) transmission mode, and after determining that the second SIM card has completed sending of a SIP request and receiving of a SIP response, interrupting an established TCP socket.

According to a second aspect, an embodiment of the present application provides a communication configuration apparatus, which is applied to an electronic device, where the electronic device includes at least two subscriber identity module SIM cards, a first SIM card is used to provide mobile data service communication, a second SIM card is registered with an IMS service, and the apparatus includes:

a first configuration module, configured to: in a case that the electronic device is used as a SIP client, configure that the second SIM card communicates with a SIP server by using a UDP transmission mode, or configure that the second SIM card communicates with the SIP server by using a TCP transmission mode, and after determining that the second SIM card has completed sending of a SIP request and receiving of a SIP response, interrupt an established TCP socket.

According to a third aspect, the embodiments of the present application provide an electronic device, where the electronic device includes a processor, a memory, and a program or an instruction stored in the memory and executable on the processor, and when the program or the instruction is executed by the processor, the steps of the method according to the first aspect are implemented.

According to a fourth aspect, the embodiments of the present application provide a readable storage medium, where the readable storage medium stores a program or an instruction, and when the program or the instruction is executed by a processor, the steps of the method according to the first aspect are implemented.

According to a fifth aspect, an embodiment of this application provides a chip. The chip includes a processor and a communication interface. The communication interface is coupled to the processor. The processor is configured to run a program or instructions to implement the method according to the first aspect.

According to a sixth aspect, a computer program product is provided, the computer program product is stored in a non-volatile storage medium, and when the computer program product is executed by at least one processor, the method according to the first aspect is implemented.

In the embodiments of this application, the first SIM card of the electronic device is used to provide mobile data service communication, and the second SIM card is registered with the IMS service. In a case that the electronic device is used as a SIP client, it is configured that the second SIM card communicates with a SIP server by using a UDP transmission mode, or it is configured that the second SIM card communicates with the SIP server by using a TCP transmission mode, and after determining that the second SIM card has completed sending of a SIP request and receiving of a SIP response, an established TCP socket is interrupted.

DETAILED DESCRIPTION

The following describes the embodiments of this application with reference to the accompanying drawings in the embodiments of this application. Apparently, the described embodiments are some rather than all of the embodiments of this application. Based on the embodiments of this application, all other embodiments obtained by a person of ordinary skill in the art without creative efforts fall within the protection scope of this application.

Terms "first" and "second" in the specification and claims of this application are used to distinguish between similar objects, and do not need to be used to describe a specific order or sequence. It should be understood that data used in this way may be interchangeable in appropriate cases, so that the embodiments of this application can be implemented in a sequence other than those shown or described herein. In addition, in the specification and the claims, "and/or" represents at least one of connected objects, and a character "/" generally represents an "or" relationship between associated objects.

The control method provided by the embodiments of the present application will be described in detail below through specific embodiments and application scenarios with reference to the accompanying drawings.

Figure 1:
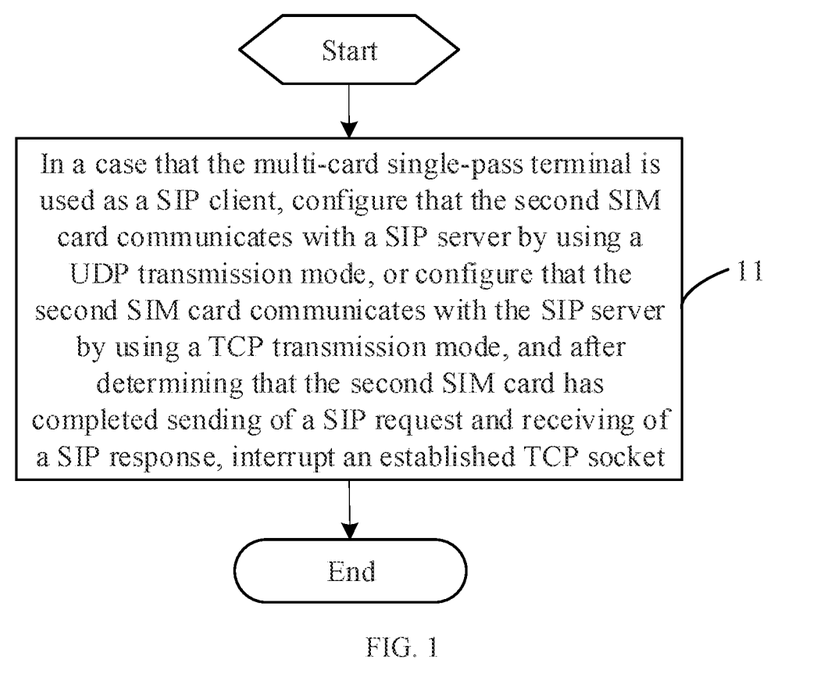
FIG. 1 is a schematic flowchart of a communication configuration method according to an embodiment of the present application.

The present application provides a communication configuration method, which is applied to an electronic device, where the electronic device includes at least two Subscriber Identity Module (SIM) cards, a first SIM card is used to provide mobile data service communication, that is, the first SIM card is a network card used to provide mobile data traffic, the second SIM card is registered with an IP Multimedia Subsystem (IMS) service, and there is at least one second SIM card. As shown in FIG. 1, the communication configuration method includes:

Step 11: In a case that the electronic device is used as a Session Initiation Protocol (SIP) client, configure that the second SIM card communicates with a SIP server by using a User Datagram Protocol (UDP) transmission mode, or configure that the second SIM card communicates with the SIP server by using a Transmission Control Protocol (TCP) transmission mode, and after determining that the second SIM card has completed sending of a SIP request and receiving of a SIP response, interrupt an established TCP socket.

IMS is the basic solution for providing voice and video communication on the current Long-Term Evolution (LTE), and will also be the basis of the 5G voice solution in the future. Based on the SIP protocol, IMS provides call services through Packet Switch (PS) based on Transmission Control Protocol/Internet Protocol (TCP/IP) connection, uses characteristics of bandwidth and delay of LTE and 5G, and can provide high-quality call services. On a multi-card single-pass electronic device, an IMS of each SIM card needs to be online all the time to ensure that the card can receive a call.

TCP is a connection-oriented transmission mode. In data transmission, a reliable connection needs to be established between two communicating parties, which is called a socket. The establishment of socket needs to be based on IP addresses and ports of both communicating parties, that is, a TCP connection is established between an IP address and a port of one communicating party and an IP address and a port of the other communicating party. UDP is a method of sending encapsulated IP packets without establishing a connection. An end that initiates a connection establishment request on the socket is called a client, and an end that receives a connection establishment request is a server. A SIP message in the IMS system is based on the TCP or UDP transmission mode, and the data of the SIP protocol is sent and received through the TCP or UDP socket.

In the SIP protocol, the communication mode of SIP request and SIP response is adopted. Both communicating parties use a context control mechanism called a transaction. For two communicating parties, a party that sends a SIP request is a client, maintains a client transaction, and needs to receive a SIP response at the same time; a party that receives the SIP request is a server, maintains a server transaction, and needs to send a SIP response to the client after receiving a SIP request. Both communicating parties can send SIP requests and receive SIP requests. Therefore, both communicating parties can be clients and servers at the same time, and can also establish a client transaction and a server transaction at the same time.

For example, when a mobile phone initiates a calling call, it needs to send a SIP request to the network server. Therefore, in this case, the mobile phone is the client and the network server is the server. When the mobile phone receives a called call, a network sends a SIP request to the mobile phone. Therefore, in this case, the mobile phone is the server, and the network server is the client.

It should be noted that the electronic device may use a UDP transmission method, and may also use a TCP transmission method. The protocol requires that when the length of the SIP data packet exceeds a certain threshold, TCP must be used for transmission. There is a keep alive mechanism in the TCP transmission protocol. One communicating party sends a keep alive data packet (heartbeat packet) to a peer end at a certain interval, and the peer end needs to reply with an ACKnowledgment character (ACK). This mechanism can ensure that the links at both ends are normal, and at the same time abnormal sockets are released. Because the IMS needs to be online all the time, the mobile phone terminal generally maintains the socket after it is established and does not delete the socket. Therefore, even if there is no service such as making calls, the server may also send a TCP keep alive packet to the mobile phone terminal.

In the above-described embodiment, for a TCP socket when the electronic device is a calling party (referred to as socket1 herein), the electronic device is a SIP client, and the IMS server is the server. For a TCP socket when the electronic device is a called party (referred to as socket2 herein), the electronic device is the SIP server, and the IMS server is the client. In this embodiment, when the electronic device is used as a SIP client, in some implementations, it can be configured that the second SIM card communicates with the SIP server by using the UDP transmission mode. Since the UDP transmission mode does not require TCP keep-alive, this can avoid that because the second SIM card sends a keep-alive data packet and therefore preempts an antenna resource, a low-delay data communication service of the first SIM card is interrupted, resulting in freezes. In some implementations, it may be configured that the second SIM card communicates with the SIP server by using a TCP transmission mode, and after determining that the second SIM card has completed sending of a SIP request and receiving of a SIP response, an established TCP socket is interrupted. In this way, subsequent sending of unnecessary keep-alive data packets can be avoided. Therefore, this can avoid that because of preemption of an antenna resource, a low-delay data communication service of the first SIM card is interrupted, resulting in freezes.

In an embodiment, the method further includes:

in a case that the electronic device is used as a SIP server, prohibiting the second SIM card of the electronic device from sending a heartbeat packet that is used to maintain a TCP connection.

In this embodiment, when the electronic device is used as a SIP server, the electronic device cannot determine whether the IMS server serving as the SIP client still sends a subsequent SIP request. In order to avoid risks to the communication, the socket cannot be disconnected actively. At the same time, the electronic device cannot determine whether the transmission mode of the SIP request sent by the server is TCP or UDP. However, by configuring that the electronic device serving as the server is prohibited from sending a keep-alive data packet (heartbeat packet), this can greatly reduce the problem that because the second SIM card preempts antenna resources, the low-delay data communication service of the first SIM card is interrupted, resulting in freezes.

It should be pointed out that because the suspended TCP socket theoretically wastes server resources and has a greater impact on the server, in most cases, the server is more likely to send TCP keep-alive. Therefore, in this scenario, the possibility that the IMS server as the client sends TCP keep-alive is relatively low, or an interval of the IMS server as the client is configured as being relatively large, which has limited impact on a game.

In an embodiment, in the above step 11, the configuring that the second SIM card communicates with the SIP server by using a TCP transmission mode, and after determining that the second SIM card has completed sending of a SIP request and receiving of a SIP response, interrupting an established TCP socket includes:

in a case that the electronic device performs data communication through the first SIM card and the second SIM card is in the TCP transmission mode, if it is determined that the second SIM card has completed sending of a SIP request and receiving of a SIP response, actively interrupting the established TCP socket, and reconfiguring that the second SIM card sends a SIP request and receives a SIP response by using a UDP transmission mode.

A data communication state of the first SIM card includes but is not limited to: data communication states with high real-time requirements such as online games, online video, video calls, and remote assistance.

In this embodiment, in a case that the electronic device performs data communication through the first SIM card and the second SIM card is in the TCP transmission mode, when it is determined that the second SIM card has completed sending of a SIP request and receiving of a SIP response, the established TCP socket is actively interrupted, and it is reconfigured that the second SIM card sends a SIP request and receives a SIP response by using a UDP transmission mode. This can effectively avoid that because the second SIM card sends keep-alive data packets and preempts the antenna resources, the low-delay data communication service of the first SIM card is interrupted, resulting in freezes.

Further, in the case that the electronic device performs data communication through the first SIM card and the second SIM card is in a TCP transmission mode, the method further includes:

if it is determined that the second SIM card has not completed sending of the SIP request and receiving of the SIP response, when it is determined that a client transaction of the second SIM card is in a terminated state, determining whether the electronic device performs data communication through the first SIM card; and in a case that it is determined that the electronic device performs data communication through the first SIM card, interrupting the established TCP socket, and reconfiguring that the second SIM card sends a SIP request and receives a SIP response by using a UDP transmission mode.

In this embodiment, when the electronic device is in the state of performing data communication through the first SIM card, the second SIM card may not have completed the sending of the SIP request and the receiving of the SIP response. Therefore, the TCP socket connection cannot be interrupted immediately. For this situation, in this embodiment, when it is detected that the client transaction of the second SIM card is in the terminated state, it is further determined, based on the data communication state of the first SIM card, whether the TCP socket connection needs to be interrupted. In a case that the first SIM card is in a data communication state (such as online game), the established TCP socket is interrupted, and it is reconfigured that the second SIM card sends a SIP request and receives a SIP response by using a UDP transmission mode. This can effectively avoid that because the second SIM card sends keep-alive data packets and preempts the antenna resources, the low-delay data communication service of the first SIM card is interrupted, resulting in freezes.

In an embodiment, in the above step 11, in a case that the electronic device is used as a SIP client, configuring that the second SIM card communicates with a SIP server by using a UDP transmission mode includes:

in a case that it is determined that the electronic device performs data communication through the first SIM card and the electronic device is used as a SIP client, configuring that the second SIM card communicates with the SIP server by using the UDP transmission mode.

In this embodiment, in a case that it is determined that the electronic device performs data communication through the first SIM card, it is directly configured that the second SIM card communicates with the SIP server by using the UDP transmission mode. This can avoid that because the second SIM card sends a keep-live data packet and preempts the antenna resource, the low-delay data communication service of the first SIM card is interrupted, resulting in freezes.

In an embodiment, in the above step 11, after the step of interrupting an established TCP socket after determining that the second SIM card has completed sending of a SIP request and receiving of a SIP response, to ensure the requirement of sending a normal SIP request, the method also includes the following two implementations:

Manner 1

In a case that it is determined that the second SIM card has a SIP request to be sent, it is determined whether there is an available TCP socket, if not, a TCP socket is re-established, and the SIP request is sent, and the SIP response is received on the re-established TCP socket.

In this way, when determining that the second SIM card has a SIP request to be sent, it is detected whether there is a TCP socket available for the client transaction locally, and if not, a new TCP socket needs to be established. Then, the second SIM card establishes a new client transaction for the current SIP request according to the protocol, and uses the TCP socket to send the SIP request and receive the SIP response.

Further, after it is determined that the electronic device as the SIP client has completed usage of the TCP socket, the established TCP socket is interrupted. In this way, the TCP keep-alive sent by the network server does not need to be received. This can effectively reduce that because the second SIM card sends keep-alive data packets and preempts the antenna resources, the low-delay data communication service of the first SIM card is interrupted, resulting in freezes.

Manner 2

In a case that it is determined that the second. SIM card has a SIP request to be sent, the SIP request is sent, and the SIP response is received by using the VIP transmission mode.

In this way, in a case that it is determined that the second SIM card has a SIP request to be sent, the SIP request is sent, and the SIP response is received directly by using the IMP transmission mode. This can avoid that because the second SIM card sends keep-alive data packets and preempts the antenna resources, the low-delay data communication service of the first SIM card is interrupted, resulting in freezes.

It should be pointed out that the manner of interrupting the TCP socket in the above embodiment may include: a manner of sending a TCP RST packet or a manner of sending a TCP FIN packet. Further, the timing of the interruption may include: the amount of interactive data of the first SIM card is lower than a first threshold, or indication information sent by the application is received, where the indication information is transmitted through an interface between the application and the electronic device.

The communication configuration method of the present application will be exemplarily described below in conjunction with FIG. 2.

Figure 2:
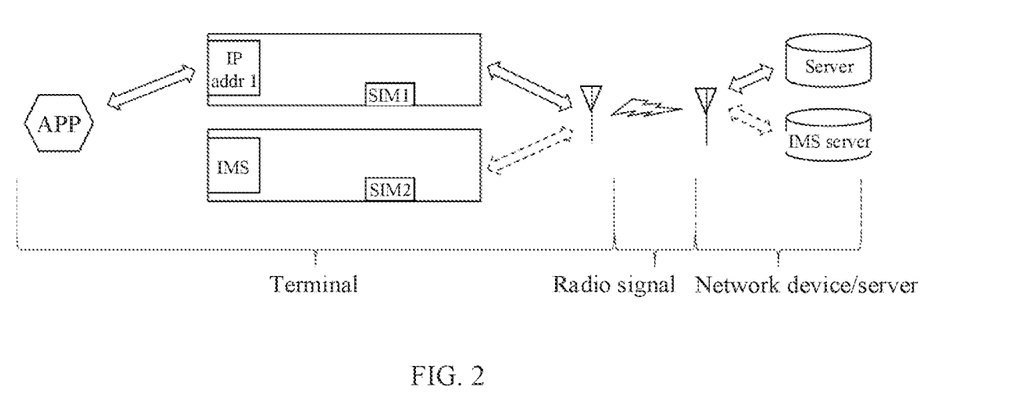
FIG. 2 is a schematic diagram of a communication architecture of a dual-card single-pass electronic device.

As shown in FIG. 2, FIG. 2 is an architecture diagram of system implementation of two SIM cards. When two SIM cards (SIM1 and SIM2) are inserted into an electronic device (such as a mobile phone), the electronic device can maintain two paths to the network. A game application (APP) uses a data network service provided by SIM 1 to play online game, while SIM 2 is registered with an IMS service, a TCP/IP transmission mode needs to be used, and the network may send keep-alive. In this scenario, the communication configuration method provided by this application includes the following four examples:

1. Communication Configuration Manner without Reference to a Game State

Example 1

In the case that the electronic device is used as a SIP server, it is configured that a TCP keep-alive packet is not actively sent.

For a socket when the electronic device is used as the SIP client, SIM2 always actively disconnects the TCP socket connection immediately after completing sending of the SIP request and receiving of the SIP response, which can be divided into the following steps:

Step 1: Initially, the user sets that the electronic device uses a mobile data network connection provided by SIM1, and at the same time, SIM2 enables IMS to provide a call service.

In this way, when the user subsequently uses a networking service, such as online game, the user needs to use the mobile data network of SIM1, while the IMS service used by SIM2 may have TCP keep-alive behavior.

Step 2: When SIM2 needs to send a SIP request, check whether there is a local TCP socket available for client transaction, and if not, establish a new TCP socket. Then, the SIM2 establishes a new client transaction for the current SIP request according to the protocol, and uses the TCP socket to send the SIP request and receive the SIP response.

Step 3: When a client transaction of SIM2 enters a terminated state, check whether all current client transactions using the TCP transmission mode have terminated. If all client transactions have terminated, all TCP sockets available for client transactions are interrupted. The interruption mode can be a TCP RST mode or a TCP FIN mode.

In this way, because the TCP socket used by the terminal as the client is interrupted every time the TCP socket is used, the TCP keep-alive sent by the network server does not need to be received.

Example 2: In the case that the electronic device is used as a SIP server, it is configured that a TCP keep-alive packet is not actively sent.

Socket of the electronic device as a SIP client: The electronic device configures that SIM2 always sends a SIP request and a SIP response by using UDP. UDP does not require TCP keep-alive, and therefore there will be no freezes caused by keep-alive.

2. Communication Configuration Manner with Reference to a Game State

Example 1

In the case that the electronic device is used as a SIP server, it is configured that a TCP keep-alive packet is not actively sent.

Socket of the electronic device as a SIP client: when the user is starting the game or is in the middle of the game, actively disconnecting the responding TCP socket can be divided into the following steps:

Step 1: Initially, the user sets that the terminal uses a mobile data network connection provided by SIM1, and at the same time, SIM2 enables IMS to provide a call service. In this way, when the user subsequently uses a networking service, such as online game, the user needs to use the data network of SIM1, while the IMS service used by SIM2 may have TCP keep-alive behavior.

Step 2: When the user starts the game, the terminal actively detects whether all current client transactions using the TCP transmission mode have terminated. If all client transactions have terminated, all TCP sockets available for client transactions are interrupted. The interruption mode can be a TCP RST mode or a TCP FIN mode.

Step 3: When SIM2 of the terminal needs to send a SIP request, check whether there is a local TCP socket available for client transaction, and if not, establish a new TCP socket. Then, the SIM2 establishes a new client transaction for the current SW request according to the protocol, and uses the TCP socket to send the SIP request and receive the SIP response.

Step 4: When a client transaction of SIM2 enters a terminated state, check whether all current client transactions using the TCP transmission mode have terminated, and determine whether the user has started the game. If all client transactions have terminated and the game has started, all TCP sockets available for client transactions are interrupted. The interruption mode can be a TCP RST mode or a TCP FIN mode.

In this way, in the game state, because the TCP socket used by the terminal as the client is interrupted every time the TCP socket is used, the TCP keep-alive sent by the network server does not need to be received.

Example 2

In the case that the electronic device is used as a SIP server, it is configured that a TCP keep-alive packet is not actively sent.

For the socket when the mobile phone is used as a client: When the electronic device is in the game state, the terminal actively disconnects the TCP socket, and configures that SIM2 sends a subsequent SIP request and SIP response by using UDP. UDP does not require TCP keep-alive, and therefore there will be no foregoing problem. After the game is over, the usage of TCP can be restored, which can include the following steps:

Step 1: Initially, the user sets that the electronic device uses a mobile data network connection provided by SIM1, and at the same time, SIM2 enables IMS to provide a call service. In this way, when the user subsequently uses a networking service, such as online game, the user needs to use the mobile data network of SIM1, while the IMS service used by SIM2 may have TCP keep-alive behavior.

Step 2: When the user starts the game, the electronic device actively detects whether all current client transactions using the TCP transmission mode have terminated. If all client transactions have terminated, all TCP sockets available for client transactions are interrupted. If there are unterminated client transactions, the TCP socket will be interrupted immediately when all client transactions are terminated. The interruption mode can be a TCP RST mode or a TCP FIN mode.

Step 3: When SIM2 needs to send a SIP request, if it is detected that it is currently in the game state, actively send a SIP request and receive a SIP response by using the UDP transmission mode.

Step 4: When a client transaction of SIM2 enters a terminated state, check whether all current client transactions using the TCP transmission mode have terminated, and determine whether the user has started the game. If all client transactions have terminated and the game has started, all TCP sockets available for client transactions are interrupted. The interruption mode can be a TCP RST mode or a TCP FIN mode.

Step 5: When the user leaves the game state, the electronic device can choose to re-establish the TCP socket as soon as possible, or re-establish the TCP socket after delaying for a certain period of time to send subsequent SIP requests, or wait for a SIP sending request and then re-establish the TCP socket, or can continue to reserve the UDP transmission mode.

In this way, in the game state, the TCP socket is interrupted immediately after the TCP socket is used, and subsequently the UDP transmission mode is used. Therefore, the TCP keep-alive sent by the network server does not need to be received.

It should be noted that, for the communication configuration method provided in the embodiment of the present application, the execution body may be a communication configuration apparatus, or a control module in the communication configuration apparatus for executing the communication configuration method. In the embodiments of the present application, the communication configuration method being performed by the communication configuration apparatus is taken as an example to illustrate the communication configuration method provided in the embodiments of the present application.

Figure 3:
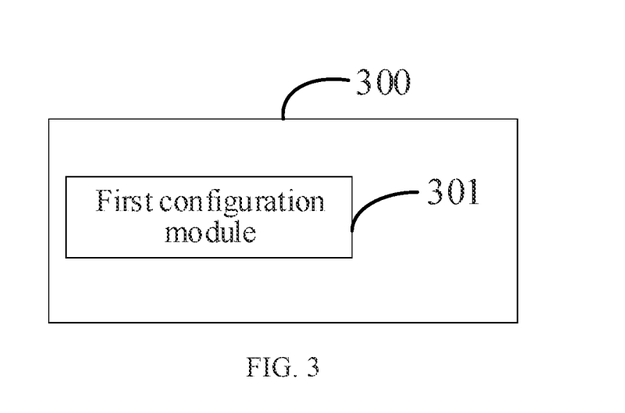
FIG. 3 is a block diagram of a communication configuration apparatus according to an embodiment of the present application.

As shown in FIG. 3, an embodiment of the present application also provides a communication configuration apparatus, which is applied to an electronic device, where the electronic device includes at least two subscriber identity module SIM cards, a first SIM card is used to provide mobile data service communication, that is, the first SIM card is used to provide mobile data service communication, the second SIM card is registered with an IMS service, and the apparatus 300 includes:

a first configuration module 301, configured to: in a case that the electronic device is used as a SIP client, configure that the second SIM card communicates with a SIP server by using a UDP transmission mode, or configure that the second SIM card communicates with the SIP server by using a TCP transmission mode, and after determining that the second SIM card has completed sending of a SIP request and receiving of a SIP response, interrupt an established TCP socket.

In some implementations, the apparatus 300 also includes:

a second configuration module, configured to: in a case that the electronic device is used as a SIP server, prohibit the second SIM card of the electronic device from sending a heartbeat packet that is used to maintain a TCP connection.

In some implementations, the first configuration module 301 includes:

a first configuration submodule, configured to: in a case that the electronic device performs data communication through the first SIM card and the second SIM card is in the TCP transmission mode, if it is determined that the second SIM card has completed sending of a SIP request and receiving of a SIP response, actively interrupt the established TCP socket, and reconfigure that the second SIM card sends a SIP request and receives a SIP response by using a UDP transmission mode.

In some implementations, in the case that the electronic device performs data communication through the first SIM card and the second SIM card is in a TCP transmission mode, the apparatus 300 further includes:

a first determination submodule, configured to: if it is determined that the second SIM card has not completed sending of the SIP request and receiving of the SIP response, when it is determined that a client transaction of the second SIM card is in a terminated state, determine whether the electronic device performs data communication through the first SIM card; and a second configuration submodule, configured to: in a case that it is determined that the electronic device performs data communication through the first SIM card, interrupt the established TCP socket, and reconfigure that the second SIM card sends a SIP request and receives a SIP response by using a UDP transmission mode.

In some implementations, the first configuration module 301 includes:

a third configuration submodule, configured to: in a case that it is determined that the electronic device performs data communication through the first SIM card and the electronic device is used as a SIP client, configure that the second SIM card communicates with the SIP server by using the UDP transmission mode.

In some implementations, the apparatus 300 further includes:

a third configuration module, configured to: in a case that it is determined that the second SIM card has a SIP request to be sent, determine whether there is an available TCP socket; if not, re-establish a TCP socket, and send the SIP request and receive the SIP response on the re-established TCP socket.

In some implementations, the apparatus 300 also includes: a fourth configuration module, configured to: in a case that it is determined that the second SIM card has a SIP request to be sent, send the SIP request and receive the SIP response by using the UDP transmission mode.

The communication configuration apparatus in the embodiment of the present application may be a device, or a component, an integrated circuit, or a chip in a terminal. The apparatus may be a mobile electronic device, or may be a non-mobile electronic device. For example, the mobile electronic device may be a mobile phone, a tablet computer, a notebook computer, a palmtop computer, an in-vehicle electronic device, a wearable device, an Ultra-Mobile Personal Computer (UMPC), a netbook, a Personal Digital Assistant (PDA), or the like. The non-mobile electronic device may be a server, a Network Attached Storage (NAS), a personal computer, a television, a teller machine, a self-service machine, or the like. This is not specifically limited in the embodiments of this application.

The communication configuration apparatus in the embodiment of the present application may be an apparatus with an operating system. The operating system may be an Android operating system, an iOS operating system, or another possible operating system. This is not specifically limited in this embodiment of this application.

The communication configuration apparatus provided in the embodiment of the present application can implement various processes implemented by the communication configuration apparatus in the method embodiment in FIG. 1, and details are not repeated here to avoid repetition.

In the communication configuration apparatus 300 in the embodiments of the present application, when the electronic device is used as a SIP client, in some implementations, it can be configured that the second SIM card communicates with the SIP server by using the UDP transmission mode. Since the UDP transmission mode does not require TCP keep-alive, this can avoid that because the second SIM card sends a keep-alive data packet and therefore preempts an antenna resource, a low-delay data communication service of the first SIM card is interrupted, resulting in freezes. In some implementations, it may be configured that the second SIM card communicates with the SIP server by using a TCP transmission mode, and after determining that the second SIM card has completed sending of a SIP request and receiving of a SIP response, an established TCP socket is interrupted. In this way, subsequent sending of unnecessary keep-alive data packets can be avoided. Therefore, this can avoid that because of preemption of an antenna resource, a low-delay data communication service of the first SIM card is interrupted, resulting in freezes.

Figure 4:
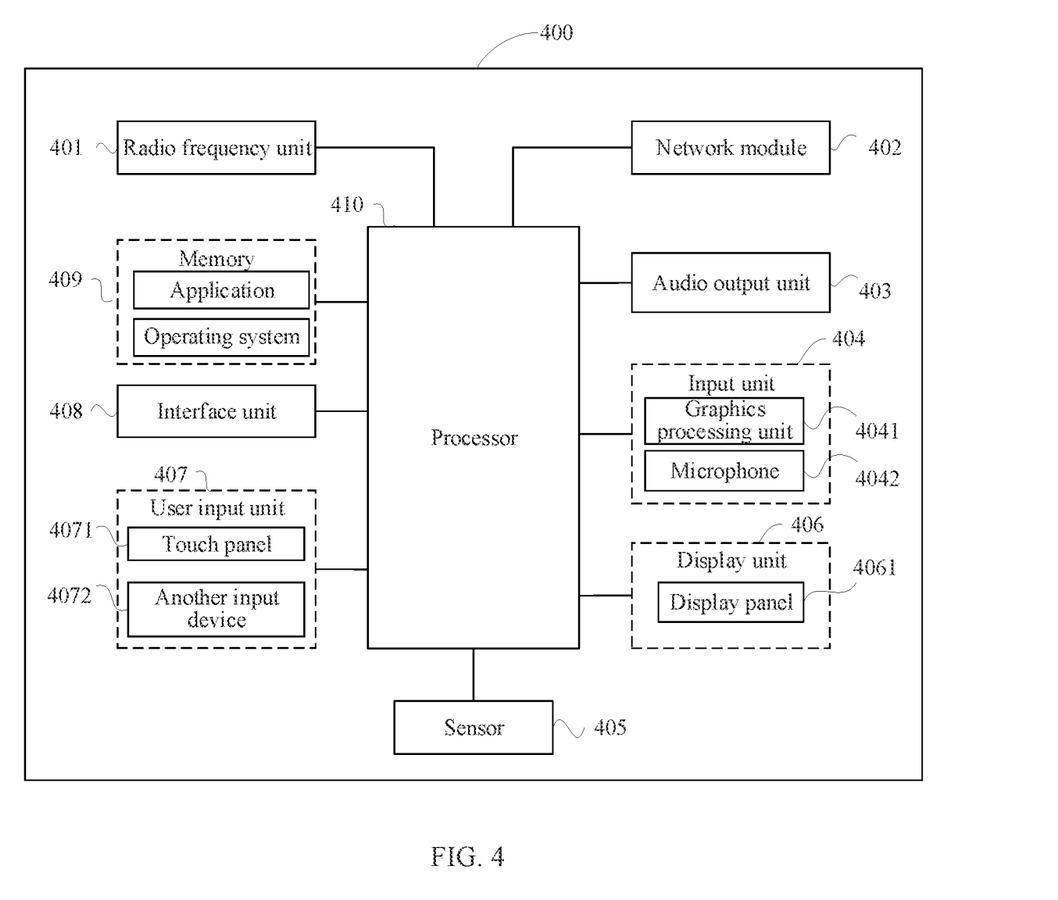
FIG. 4 is a schematic diagram of a hardware structure of an electronic device according to an embodiment of this application.

In some implementations, the embodiments of the present application further provide an electronic device, including a processor 410, a memory 409, and a program or instruction stored in the memory 409 and executable on the processor 410, When the program or instruction is executed by the processor 410, each process of the control method embodiment described above of the foldable electronic device can be realized, and the same technical effect can be achieved. To avoid repetition, details are not repeated herein.

It should be noted that the electronic device in this embodiment of this application includes the foregoing mobile electronic device and the foregoing non-mobile electronic device.

FIG. 4 is a schematic diagram of a hardware structure of an electronic device for implementing embodiments of this application.

The electronic device 400 includes but is not limited to components such as a radio frequency unit 401, a network module 402, an audio output unit 403, an input unit 404, a sensor 405, a display unit 406, a user input unit 407, an interface unit 408, a memory 409, and a processor 410.

It may be understood by a person skilled in the art that the electronic device 400 may further include a power supply (such as a battery) that supplies power to each component. The power supply may be logically connected to the processor 410 by using a power management system, to implement functions such as charging, discharging, and power consumption management by using the power management system. The structure of the electronic device shown in FIG. 4 does not constitute a limitation on the electronic device. The electronic device may include components more or fewer than those shown in the figure, or some components may be combined, or there may be a different component arrangement. Details are not described herein.

The electronic device 400 includes at least two subscriber identity module SIM cards, where the first SIM card of the electronic device is used to provide mobile data service communication, and the second SIM card is registered with the IMS service. The processor 410 is configured to: in a case that the electronic device is used as a SIP client, configure that the second SIM card communicates with a SIP server by using a UDP transmission mode, or configure that the second SIM card communicates with the SIP server by using a TCP transmission mode, and after determining that the second SIM card has completed sending of a SIP request and receiving of a SIP response, interrupt an established TCP socket.

In some implementations, the processor 410 is also configured to: in a case that the electronic device is used as a SIP server, prohibit the second SIM card of the electronic device from sending a heartbeat packet that is used to maintain a TCP connection.

In some implementations, the processor 410 is further configured to: in a case that the electronic device performs data communication through the first SIM card and the second SIM card is in the TCP transmission mode, if it is determined that the second SIM card has completed sending of a SIP request and receiving of a SIP response, actively interrupt the established TCP socket, and reconfigure that the second SIM card sends a SIP request and receives a SIP response by using a UDP transmission mode.

In some implementations, the processor 410 is further configured to: if it is determined that the second SIM card has not completed sending of the SIP request and receiving of the SIP response, when it is determined that a client transaction of the second SIM card is in a terminated state, determine whether the electronic device performs data communication through the first SIM card; and in a case that it is determined that the electronic device performs data communication through the first SIM card, interrupt the established TCP socket, and reconfigure that the second SIM card sends a SIP request and receives a SIP response by using a UDP transmission mode.

In some implementations, the processor 410 is further configured to: in a case that it is determined that the electronic device performs data communication through the first SIM card and the electronic device is used as a SIP client, configure that the second SIM card communicates with the SIP server by using the UDP transmission mode.

In some implementations, the processor 410 is also configured to: in a case that it is determined that the second SIM card has a SIP request to be sent, determine whether there is an available TCP socket, if not, re-establish a TCP socket, and send the SIP request and receive the SIP response on the re-established TCP socket.

In some implementations, the processor 410 is further configured to: in a case that it is determined that the second SIM card has a SIP request to be sent, send the SIP request and receive the SIP response by using the UDP transmission mode.

In the embodiments of the present application, when the electronic device is used as a SIP client, in one solution, it can be configured that the second SIM card communicates with the SIP server by using the IMP transmission mode. Since the UDP transmission mode does not require TCP keep-alive, this can avoid that because the second. SIM card sends a keep-alive data packet and therefore preempts an antenna resource, a low-delay data communication service of the first SIM card is interrupted, resulting in freezes. In a second solution, it may be configured that the second SIM card communicates with the SIP server by using a TCP transmission mode, and after determining that the second SIM card has completed sending of a SIP request and receiving of a SIP response, an established TCP socket is interrupted. In this way, subsequent sending of unnecessary keep-alive data packets can be avoided. Therefore, this can avoid that because of preemption of an antenna resource, a low-delay data communication service of the first SIM card is interrupted, resulting in freezes.

It should be understood that, in this embodiment of this application, the input unit 404 may include a Graphics Processing Unit (GPU) 4041 and a microphone 4042. The graphics processing unit 4041 processes image data of a static picture or a video obtained by an image capture apparatus (such as a camera) in a video capture mode or an image capture mode. The display unit 406 may include a display panel 4061. In some implementations, the display panel 4061 may be configured in a form such as a liquid crystal display or an organic light-emitting diode. The user input unit 407 includes a touch panel 4071 and another input device 4072. The touch panel 4071 is also referred to as a touchscreen. The touch panel 4071 may include two parts: a touch detection apparatus and a touch controller. The another input device 4072 may include but is not limited to a physical keyboard, a functional button (such as a volume control button or a power on/off button), a trackball, a mouse, and a joystick. Details are not described herein. The memory 409 may be configured to store a software program and various data, including but not limited to an application program and an operating system. The processor 410 may be integrated with an application processor and a modem processor. The application processor mainly processes an operating system, a user interface, an application program, and the like. The modem processor mainly processes wireless communication. It can be understood that, alternatively, the modem processor may not be integrated into the processor 410.

The embodiments of the present application also provide a readable storage medium, the readable storage medium may be non-transitory, and a program or instruction is stored on the readable storage medium, and when the program or instruction is executed by the processor, each process of the embodiment of the communication configuration method is performed, and the same technical effect can be achieved. To avoid repetition, details are not repeated herein.

The processor is a processor in the electronic device in the foregoing embodiment. The readable storage medium includes a computer-readable storage medium, such as a computer Read-Only Memory (ROM), a Random Access Memory (RAM), a magnetic disk, or an optical disc.

An embodiment of the present application further provides a chip, the chip includes a processor and a communication interface, the communication interface is coupled to the processor, and the processor is configured to run programs or instructions to implement each process of the embodiment of the foregoing communication configuration method and the same technical effects can be achieved. To avoid repetition, details are not described herein again.

It should be understood that the chip mentioned in this embodiment of this application may also be referred to as a system-level chip, a system chip, a chip system, or a system on a chip.

The embodiment of the present application further provides a computer program product, the computer program product is stored in a non-volatile storage medium, and the computer program product is executed by at least one processor to implement the various processes in the above communication configuration method embodiment, and can achieve the same technical effect. To avoid repetition, it will not be repeated herein.

It should be noted that, in this specification, the terms "include," "comprise," or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that a scope of the method and the apparatus in the implementations of this application is not limited to: performing a function in a sequence shown or discussed, and may further include: performing a function in a basically simultaneous manner or in a reverse sequence based on an involved function. For example, the described method may be performed in a different order, and various steps may be added, omitted, or combined. In addition, features described with reference to some examples may be combined in other examples.

Based on the descriptions of the foregoing implementations, a person skilled in the art may understand that the method in the foregoing embodiment may be implemented by software in addition to a necessary universal hardware platform or by hardware only. Based on such an understanding, the technical solutions of this application essentially, or the part contributing to the prior art may be implemented in a form of a computer program product. The computer program product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

The embodiments of this application are described with reference to the accompanying drawings. However, this application is not limited to the foregoing specific implementations. The foregoing specific implementations are merely examples, but are not limiting. Under the enlightenment of this application, a person of ordinary skill in the art may make many forms without departing from the objective and the scope of the claims of this application, and these forms all fall within the protection scope of this application.

The invention claimed is:

1. A communication configuration method, performed by an electronic device, wherein the electronic device comprises:

at least two Subscriber Identity Module (SIM) cards, wherein a first SIM card of the at least two SIM cards is used to provide mobile data service communication, a second SIM card of the at least two SIM cards is registered with an IP Multimedia Subsystem (IMS) service, and the method comprises:

during the electronic device is used as a Session Initiation Protocol (SIP) client and, at the same time, performs data communication through the first SIM card, configuring that the second SIM card communicates with a SIP server by using a User Datagram Protocol (UDP) transmission mode; or configuring that the second SIM card communicates with the SIP server by using a Transmission Control Protocol (TCP) transmission mode, and after determining that the second SIM card has completed sending of a SIP request and receiving of a SIP response, interrupting an established TCP socket; and during the electronic device is used as a SIP server, prohibiting the second SIM card of the electronic device from sending a heartbeat packet that is used to maintain a TCP connection.

2. The communication configuration method according to claim 1, wherein the configuring that the second SIM card communicates with the SIP server by using a TCP transmission mode, and after determining that the second SIM card has completed sending of a SIP request and receiving of a SIP response, interrupting an established TCP socket comprises:

when the electronic device performs data communication through the first SIM card and the second SIM card is in the TCP transmission mode, and when it is determined that the second SIM card has completed sending of a SIP request and receiving of a SIP response, actively interrupting the established TCP socket, and reconfiguring that the second SIM card sends a SIP request and receives a SIP response by using a UDP transmission mode.

3. The communication configuration method according to claim 2, wherein when the electronic device performs data communication through the first SIM card and the second SIM card is in a TCP transmission mode, the method further comprises:

when it is determined that the second SIM card has not completed sending of the SIP request and receiving of the SIP response, and when it is determined that a client transaction of the second SIM card is in a terminated state, determining whether the electronic device performs data communication through the first SIM card; and when it is determined that the electronic device performs data communication through the first SIM card, interrupting the established TCP socket, and reconfiguring that the second SIM card sends a SIP request and receives a SIP response by using a UDP transmission mode.

4. The communication configuration method according to claim 1, wherein the, during the electronic device is used as a SIP client, configuring that the second SIM card communicates with a SIP server by using a UDP transmission mode comprises:

when it is determined that the electronic device performs data communication through the first SIM card and the electronic device is used as a SIP client, configuring that the second SIM card communicates with the SIP server by using the UDP transmission mode.

5. The communication configuration method according to claim 1, wherein after interrupting an established TCP socket after determining that the second SIM card has completed sending of a SIP request and receiving of a SIP response, the method further comprises:

when it is determined that the second SIM card has a SIP request to be sent, determining whether there is an available TCP socket, if not, re-establishing a TCP socket, and sending the SIP request and receiving the SIP response on the re-established TCP socket.

6. The communication configuration method according to claim 1, wherein after interrupting an established TCP socket after determining that the second SIM card has completed sending of a SIP request and receiving of a SIP response, the method further comprises:

when it is determined that the second SIM card has a SIP request to be sent, sending the SIP request and receiving the SIP response by using the UDP transmission mode.

7. An electronic device, comprising:
a memory storing computer-readable instructions; and
a processor coupled to the memory and configured to execute the computer-readable instructions, wherein the computer-readable instructions, when executed by the processor, cause the processor to perform operations comprising:

during the electronic device is used as a Session Initiation Protocol (SIP) client and, at the same time, performs data communication through a first Subscriber Identity Module (SIM) card, configuring that a second SIM card communicates with a SIP server by using a User Datagram Protocol (UDP) transmission mode; or configuring that the second SIM card communicates with the SIP server by using a Transmission Control Protocol (TCP) transmission mode, wherein the electronic device comprises at least two SIM cards, wherein the first SIM card of the at least two SIM cards is used to provide mobile data service communication, the second SIM card of the at least two SIM cards is registered with an IP Multimedia Subsystem (IMS) service, and after determining that the second SIM card has completed sending of a SIP request and receiving of a SIP response, interrupting an established TCP socket; and during the electronic device is used as a SIP server, prohibiting the second SIM card of the electronic device from sending a heartbeat packet that is used to maintain a TCP connection.

8. The electronic device according to claim 7, wherein the configuring that the second SIM card communicates with the SIP server by using a TCP transmission mode, and after determining that the second SIM card has completed sending of a SIP request and receiving of a SIP response, interrupting an established TCP socket comprises:

during the electronic device performs data communication through the first SIM card and, at the same time, the second SIM card is in the TCP transmission mode, and when it is determined that the second SIM card has completed sending of a SIP request and receiving of a SIP response, actively interrupting the established TCP socket, and reconfiguring that the second SIM card sends a SIP request and receives a SIP response by using a UDP transmission mode.

9. The electronic device according to claim 8, wherein in the case that the electronic device performs data communication through the first SIM card and the second SIM card is in a TCP transmission mode, the operations further comprise:
    when it is determined that the second SIM card has not completed sending of the SIP request and receiving of the SIP response, and when it is determined that a client transaction of the second SIM card is in a terminated state, determining whether the electronic device performs data communication through the first SIM card; and
    when it is determined that the electronic device performs data communication through the first SIM card, interrupting the established TCP socket, and reconfiguring that the second SIM card sends a SIP request and receives a SIP response by using a UDP transmission mode.

10. The electronic device according to claim 7, wherein the, during the electronic device is used as a SIP client, configuring that the second SIM card communicates with a SIP server by using a UDP transmission mode comprises:
    when it is determined that the electronic device performs data communication through the first SI M card and the electronic device is used as a SIP client, configuring that the second SIM card communicates with the SIP server by using the UDP transmission mode.

11. The electronic device according to claim 7, wherein after interrupting an established TCP socket after determining that the second SIM card has completed sending of a SIP request and receiving of a SIP response, the operations further comprise:
    when it is determined that the second SIM card has a SIP request to be sent, determining whether there is an available TCP socket, if not, re-establishing a TCP socket, and sending the SIP request and receiving the SIP response on the re-established TCP socket.

12. The electronic device according to claim 7, wherein after interrupting an established TCP socket after determining that the second SIM card has completed sending of a SIP request and receiving of a SIP response, the operations further comprise:
    when it is determined that the second SIM card has a SIP request to be sent, sending the SIP request and receiving the SIP response by using the UDP transmission mode.

13. A non-transitory computer-readable medium storing instructions that, when executed by a processor, cause the processor to perform operations comprising:
    during an electronic device is used as a Session Initiation Protocol (SIP) client and, at the same time, performs data communications through a first Subscriber Identity Module (SIM) card,
    configuring that a second SIM card communicates with a SIP server by using a User Datagram Protocol (UDP) transmission mode, or
    configuring that the second SIM card communicates with the SIP server by using a Transmission Control Protocol (TCP) transmission mode, wherein the electronic device comprises at least two SIM cards, wherein the first SIM card of the at least two SIM cards is used to provide mobile data service communication, the second SIM card of the at least two SIM cards is registered with an IP Multimedia Subsystem (IMS) service, and after determining that the second SIM card has completed sending of a SIP request and receiving of a SIP response, interrupting an established TCP socket; and
    during the electronic device is used as a SIP server, prohibiting the second SIM card of the electronic device from sending a heartbeat packet that is used to maintain a TCP connection.

14. The non-transitory computer-readable medium according to claim 13, wherein the configuring that the second SIM card communicates with the SIP server by using a TCP transmission mode, and after determining that the second SIM card has completed sending of a SIP request and receiving of a SIP response, interrupting an established TCP socket comprises:
    during the electronic device performs data communication through the first SIM card and, at the same time, the second SIM card is in the TCP transmission mode, and when it is determined that the second SIM card has completed sending of a SIP request and receiving of a SIP response, actively interrupting the established TCP socket, and reconfiguring that the second SIM card sends a SIP request and receives a SIP response by using a UDP transmission mode.

15. The non-transitory computer-readable medium according to claim 14, wherein in the case that the electronic device performs data communication through the first SIM card and the second SIM card is in a TCP transmission mode, the operations further comprise:
    when it is determined that the second SIM card has not completed sending of the SIP request and receiving of the SIP response, and when it is determined that a client transaction of the second SIM card is in a terminated state, determining whether the electronic device performs data communication through the first SIM card; and
    when it is determined that the electronic device performs data communication through the first SIM card, interrupting the established TCP socket, and reconfiguring that the second SIM card sends a SIP request and receives a SIP response by using a UDP transmission mode.

16. The non-transitory computer-readable medium according to claim 13, wherein the, during the electronic device is used as a SIP client, configuring that the second SIM card communicates with a SIP server by using a UDP transmission mode comprises:
    when it is determined that the electronic device performs data communication through the first SIM card and the electronic device is used as a SIP client, configuring that the second SIM card communicates with the SIP server by using the UDP transmission mode.

17. The non-transitory computer-readable medium according to claim 13, wherein after interrupting an established TCP socket after determining that the second SIM card has completed sending of a SIP request and receiving of a SIP response, the operations further comprise:
    when it is determined that the second SIM card has a SIP request to be sent, determining whether there is an available TCP socket, if not, re-establishing a TCP socket, and sending the SIP request and receiving the SIP response on the re-established TCP socket.

\* \* \* \* \*